Patented July 28, 1942

2,290,862

UNITED STATES PATENT OFFICE 2,290,862

CHEWING GUM AND PROCESS OF MAKING SAME

Franklin V. Canning, Douglaston, Long Island, N. Y., assignor to Gum Laboratories, Inc., Clifton Heights, Pa., a corporation of Delaware No Drawing. Application October 3, 1939, Serial No. 297,772

4 Claims. (Cl. 167—82)

The present invention relates to the manufacture of chewing gum containing a peroxide compound, which latter will be in a stable condition, so that when the gum is subsequently chewed, the moisture of the mouth will cause the formation of oxygen in the highly active state, such as nascent oxygen, which will have the effect of whitening the teeth, rendering the mouth and teeth antiseptic, and removing unsightly colors from the teeth.

Many years ago I proposed the addition of calcium peroxide, magnesium peroxide and similar peroxide compounds to chewing gums, the said peroxide compound being added to the chewing gum base or to the finished chewing gum, in a powdered condition. Such products were found not to be sufficiently stable, and although such procedure has been followed, to a greater or less extent by various manufacturers, really satisfactory products could not thereby be produced.

I have now found that it is entirely possible to stabilize the peroxide compound by first intimately incorporating the same with a hard hydrogenated fatty oil, preferably a hydrogenated vegetable oil such as peanut oil, cottonseed oil, or the like, the said hydrogenated oil being one that is a solid even at high atmospheric temperatures such as would likely be encountered in the summer time, even running up to 110° F. in some cases. Preferably the oil is hydrogenated until it has a melting point of about 55° C.

The said hydrogenated oil can be powdered in a mill operating at ordinary atmospheric temperature or a refrigerated mill, and mixed with the said peroxide compound in powdered form. The said peroxide compound and the hard hydrogenated oil can be milled together, if desired, to produce an extremely initimate mixture of the two materials, and it will be understood that the relative proportions of these two materials can be varied substantially but the said materials should be separately weighed. Milling the peroxide and the hardened oil together effectively coats the peroxide compound with the oil.

In the preferred form of carrying out the process, a finished chewing gum without the peroxide compound is first made, by mixing chewing gum base, glucose, flavoring material and sugar in any conventional proportions and by any conventional method, such as are used in the art. The said chewing gum is then warmed up somewhat to soften the same, and the mixture of hydrogenated oil and peroxide material are then added, and thoroughly incorporated into the chewing gum. This incorporation can be conveniently done by working the mixture on rolls. The mixture is then sheeted or made into sticks or lozenges of the required size, and the proportions of the material are such that the finished gum will contain about 1.5 to 2% of calcium peroxide, or an equivalent amount of magnesium peroxide or other peroxide compound. It is hardly necessary to state that the peroxide compound to be used should be nonpoisonous.

A convenient method of proceeding would be to incorporate 100 pounds of chewing gum base with 84 pounds of glucose, and 149 pounds of sugar, together with 3½ lbs. of a flavoring oil such as oil of wintergreen, oil of peppermint or the like. This operation can be performed in a heavy duty mixing kettle, e. g., a Werner-Pfleiderer mixer, while the material is heated to about 100° C. more or less. In so working, the flavoring will be added last, shortly before the end of the mixing step. Various other kinds of mixers can be used.

Separately from the above 6½ pounds of calcium peroxide are thoroughly mixed, say on a roller mill, with 12 pounds of hydrogenated peanut oil, with a melting point 55° C. Then the two mixtures are warmed up to 110° F., and are mixed together and worked on a roller mill until uniform, the said material being then worked up into sticks containing 2¼ grams each.

In a modified form of execution of the process, after the mixing of the chewing gum components is substantially complete, in a heated heavy duty mixing machine (and if desired, just before adding the flavoring oils), the heat to the mixer is shut off, and the mixture of calcium peroxide and hydrogenated oil is added, and the mixing is continued until the peroxide has been well distributed into the gum mass, and the flavoring material then added and well mixed. Then the mixture is cooled. This manner of operating gives economy as to heating agent (steam), and labor.

When the gum is chewed, the moisture of the mouth coming into contact with the peroxide compound gradually, causes the gradual liberation of active oxygen. The gum can be kept for long periods of time without notable loss of the peroxide material. It is of course understood that I do not limit myself to the proportions given above, which are purely by way of example, and the proportions can be varied between wide limits. I do not confine myself to the particular sweetening and flavoring materials mentioned, nor to any particular chewing gum base, which may be purified natural chicle or chicle substitute. It will be understood that other peroxide materials can be used, for example the following:

- Organic peroxide (e. g., stearyl or oleyl)
- Magnesium peroxide
- Sodium perborate
- Calcium perborate
- Synthetic peroxides.

I claim:

1. In the manufacture of chewing gum containing a non-toxic alkaline earth metal peroxide in a stable condition, the steps of intimately incorporating the peroxide with a hard hydrogenated fatty oil which is solid at high atmospheric temperatures, and incorporating the resulting mixture into a chewing gum material.

2. Chewing gum containing a chewing gum base and a non-toxic alkaline earth metal peroxide in which the said peroxide is in intimate admixture and coated with a hydrogenated fatty oil that will remain solid at high atmospheric temperature, whereby the said peroxide is rendered stable until wetted.

3. In the manufacture of chewing gum containing calcium peroxide in a stable condition, the steps of intimately incorporating the calcium peroxide with a hard hydrogenated fatty oil which is solid at high atmospheric temperatures, and incorporating the resulting mixture into a chewing gum material.

4. Chewing gum containing a chewing gum base and calcium peroxide in which the said peroxide is in intimate admixture and coated with a hydrogenated fatty oil that will remain solid at high atmospheric temperature, whereby the said peroxide is rendered stable until wetted.

FRANKLIN V. CANNING.